United States Patent

Berens et al.

[11] 4,093,513
[45] June 6, 1978

[54] WATER MODERATED REACTOR

[75] Inventors: Tadeusz Berens; Ragnar Mansson, both of Vasteras, Sweden

[73] Assignee: Aktiebolaget Asea-Atom, Vasteras, Sweden

[21] Appl. No.: 607,612

[22] Filed: Aug. 25, 1975

[30] Foreign Application Priority Data

Aug. 29, 1974 Sweden .................. 7410932

[51] Int. Cl.² .............................. G21C 15/00
[52] U.S. Cl. .......................... 176/37; 176/38
[58] Field of Search .............. 176/37, 38, 58, 59, 176/87; 239/208, 209

[56] References Cited

U.S. PATENT DOCUMENTS

| | | | |
|---|---|---|---|
| 3,346,459 | 10/1967 | Prince et al. | 176/36 |
| 3,816,245 | 6/1974 | Beuilacqua | 176/61 |

FOREIGN PATENT DOCUMENTS

| | | | |
|---|---|---|---|
| 2,316,007 | 10/1974 | Germany | 176/37 |
| 45-38120 | 11/1966 | Japan | 176/38 |

*Primary Examiner*—Samuel W. Engle
*Assistant Examiner*—Ralph Palo
*Attorney, Agent, or Firm*—Watson, Cole, Grindle & Watson

[57] ABSTRACT

In a water moderated reactor, which has a plurality of vertically arranged fuel assemblies enclosed in a moderator tank provided with a cover and positioned by an upper core grid, a sprinkling device is arranged above the core grid and below the cover. The sprinkling device is composed of a plurality of substantially horizontal main sprinkling tubes each provided with a plurality of nozzles. A common distributing pipe supplies sprinkling water to the main sprinkling tubes. There are a auxiliary tubes above the main sprinkling tubes and connected to them hydraulically and mechanically by a plurality of transverse metal tubes. The cover has a detachable lower part in the form of a ring to which the sprinkling device is connected.

2 Claims, 5 Drawing Figures

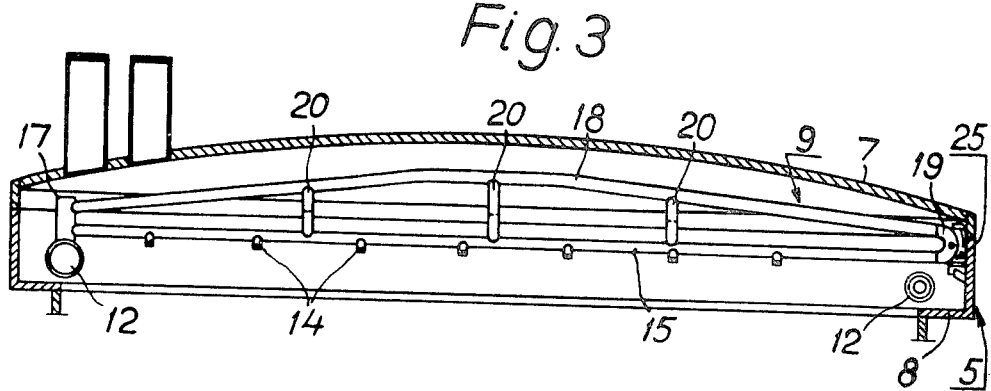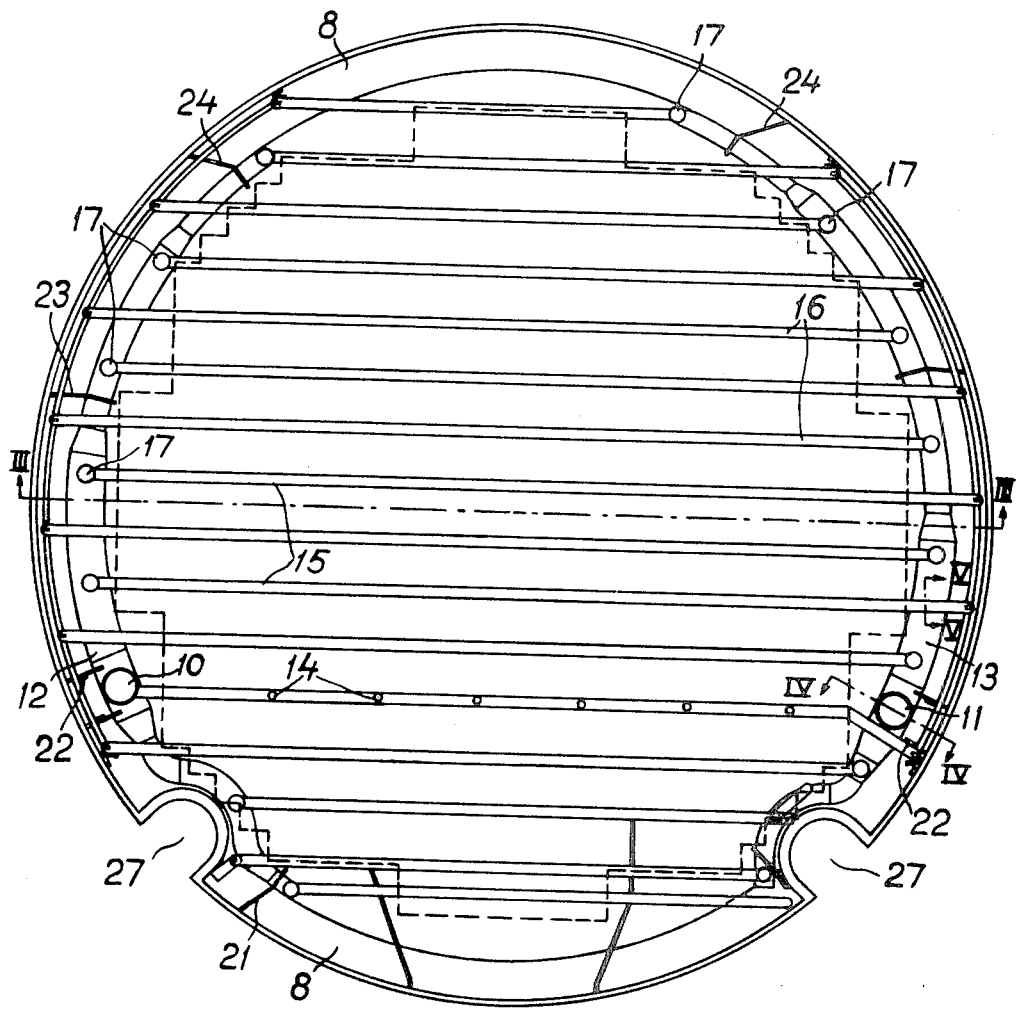

WATER MODERATED REACTOR

BACKGROUND OF THE INVENTION

1. Field of the Invention

The present invention relates to a water moderated reactor comprising a reactor pressure vessel with a plurality of vertically arranged fuel assemblies, which are enclosed in a moderator tank provided with a cover and positioned by means of an upper core grid arranged in the moderator tank, and further a sprinkling device arranged above said core grid and below said cover, said sprinkling device containing a plurality of substantially horizontal sprinkling tubes and being provided with a plurality of sprinkling nozzles, said sprinkling tubes emanating from a common distributing pipe for sprinkling water.

2. The Prior Art

In known reactors the sprinkling device is attached to the moderator tank cover by means of a plurality of vertically arranged mechanical connecting members. During sprinkling, the sprinkling tubes are suddenly cooled and adopt the temperature of the cold sprinkling water before the mechanical connecting members have had time to cool appreciably, said connecting members and particularly the sprinkling tubes being thus subjected to great mechanical stresses. This drawback is avoided in a reactor according to the invention.

SUMMARY OF THE INVENTION

According to the invention, the sprinkling device is composed of a plurality of main sprinkling tubes each of which has a plurality of nozzles. These are connected to a common distributing pipe for sprinkling water. There are auxiliary tubes which are positioned above the main sprinkling tube and are connected to them both hydraulically and mechanically by a plurality of transverse metal tubes. The cover has a lower detachable ring part to which the sprinkling device is welded.

BRIEF DESCRIPTION OF THE DRAWINGS

The invention will be described in the following with reference to the accompanying schematic drawings, in which

FIG. 2 shows the moderator tank of the reactor seen from above without a cover, and FIG. 3 shows a core sprinkling device characteristic of the invention in a section along the line III—III on FIG. 2.

DESCRIPTION OF THE PREFERRED EMBODIMENTS

Figure 1:
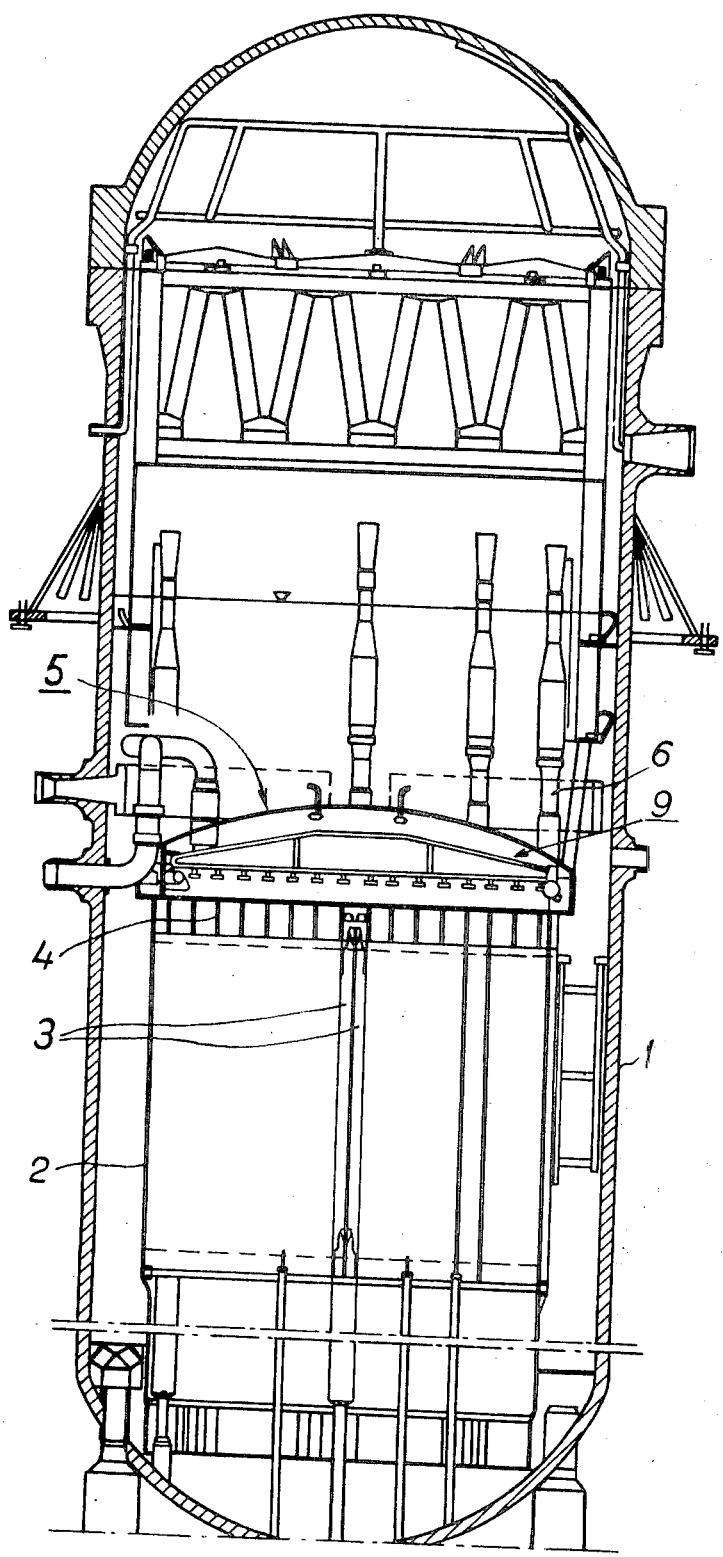
FIG. 1 shows a vertical section through a reactor according to the invention.
Figure 4:
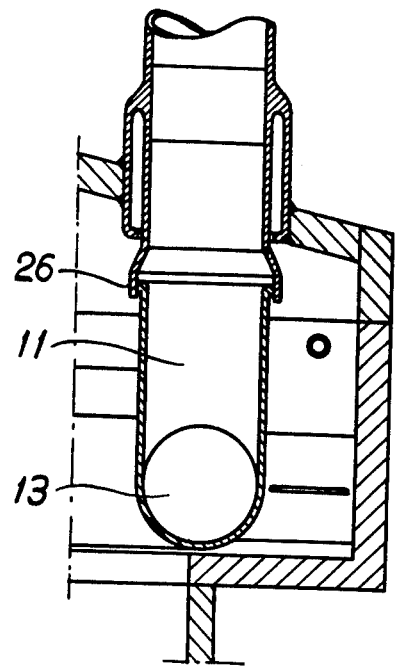
FIG. 4 is a cross-section along the line IV—IV and FIG. 5 is a cross-section along the line V—V on FIG. 2.
Figure 5:
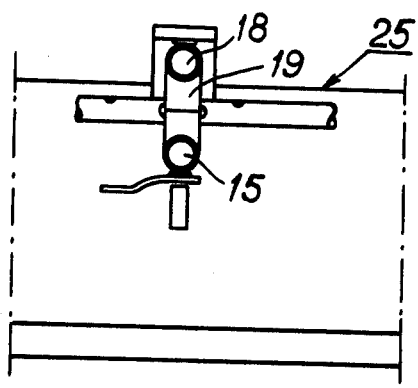

In the drawings, 1 designates the reactor pressure vessel and 2 the reactor moderator tank. The moderator tank contains a plurality of fuel assemblies 3 which are secured in their positions by means of a core grid 4 and are provided with a moderator tank cover 5, which is composed of a top part 7 formed with a large number of leading-in tubes 6 (only two being shown in the drawing), and an annular bottom part 8 which is detachable with respect to said top part 7. The bottom part 8 of the cover supports a sprinkling device 9 which comprises two mutually independent core sprinkling systems, each having one inlet tube 10 and 11, respectively, which are each connected to a distributing pipe 12 and 13, respectively. Each distributing pipe 12 has a plurality of mutually parallel sprinkling tubes provided with sprinkling nozzles 14, said sprinkling tubes in one sprinkling system being designated by 15, and in the other by 16. By means of welding, the sprinkling tubes 15 and 16 are each hydraulically and mechanically connected to the main pipes by way of a pipe socket 17. Each pipe socket 17 constitutes a hydraulic and mechanical connection between one end of a sprinkling tube 15 or 16 and an auxiliary tube 18 lying in the same vertical plane. At the other end of the sprinkling tube such a connection is achieved between the sprinkling tubes with the help of a welded U-tube 19, and at points intermediate the length of the tubes with the help of tubes 20 welded to the sprinkling tube. The distributing pipes 12 and 13 are attached to the lower annular part 8 of the moderator tank cover relatively flexible plates 21, 22, 23, 24. Each sprinkling tube with its auxiliary tube constitutes a rigid, rafter-like frame together with the tubes 17, 19, 20, said frame being attached at one end to a main pipe and at its other end to an attachment device 25 welded to the inside of the ring 8. Since this frame is self-supporting, mechanical connection members between the middle portion of the sprinkling tubes and the moderator tank cover can be dispensed with.

The hydraulic conductivity of the tubes 20 and the location of these tubes are chosen in such a way that the flux of water has practically the same value in all tube cross-sections of the frame. Thus, injurious stresses caused by temperature differences in the frame are avoided.

If, for some reason, it is desired to replace the sprinkling system in a conventional reactor when the reactor has been in operation and the sprinkling system has become radioactive, it is usually necessary at the same time to replace the entire moderator tank cover. In a reactor according to the invention, this operation can be carried out by replacing only a relatively inexpensive part of the moderator tank cover, namely the ring 8.

The joint 26 is made by inserting a thinner tube portion into a wider one - by means of slip fit or elastic deformation. The two tube parts are connected without difficulty as soon as the top part 7 of the moderator tank cover is mounted in its position on top of the bottom part 8. Each of said upper tube parts is bent 180° and passed down through an opening 27.

The preceding describes a boiling water reactor. A reactor according to the invention can also be made as a presurised water reactor.

We claim:

1. Water moderated reactor comprising a reactor pressure vessel with a plurality of vertically arranged fuel assemblies which are enclosed in a moderator tank provided with a cover and positioned by means of an upper core grid arranged in the moderator tank, and comprising a sprinkling device arranged above said core grid and below said cover, said sprinkling device comprising a plurality of substantially linear and horizontal main sprinkling tubes individually provided with a plurality of sprinkling nozzles, a common distributing pipe for sprinkling water connected to said main sprinkling tubes, a plurality of auxiliary tubes each positioned above a corresponding main sprinkling tube, and a plurality of transverse metal tubes hydraulically and mechanically connecting said auxiliary tubes to corresponding main sprinkling tubes.

2. Water moderated reactor according to claim 1, said cover having a detachable lower ring part, and said sprinkling device being welded to said ring part.

* * * * *